(12) United States Patent
Muñoz Ruiz

(10) Patent No.: US 9,534,811 B2
(45) Date of Patent: Jan. 3, 2017

(54) SOLAR FLUID PREHEATING SYSTEM HAVING A THERMOSIPHONIC APERTURE AND CONCENTRATING AND ACCELERATING CONVECTIVE NANOLENSES

(71) Applicant: Andrés Muñoz Ruiz, Nuevo Leon (MX)

(72) Inventor: Andrés Muñoz Ruiz, Nuevo Leon (MX)

(73) Assignee: FRICAECO AMERICA, SAPI DE C.V., Nuevo Leon (MX)

( * ) Notice: Subject to any disclaimer, the term of this patent is extended or adjusted under 35 U.S.C. 154(b) by 0 days.

(21) Appl. No.: 14/588,365

(22) Filed: Dec. 31, 2014

(65) Prior Publication Data

US 2016/0187030 A1   Jun. 30, 2016

(51) Int. Cl.
*F24J 2/07* (2006.01)
*F24J 2/02* (2006.01)
*F24J 2/44* (2006.01)

(52) U.S. Cl.
CPC .. *F24J 2/02* (2013.01); *F24J 2/07* (2013.01); *F24J 2/44* (2013.01)

(58) Field of Classification Search
CPC ................... F24J 3/02; F24J 2/02; F24J 2/44; F24J 2/07
USPC ..................... 126/680, 643, 440, 425; 60/670
See application file for complete search history.

(56) References Cited

U.S. PATENT DOCUMENTS

| 2,487,947 | A |   | 11/1949 | Senn |
| 3,182,654 | A | * | 5/1965 | Culling ...................... F24J 2/06 |
| | | | | 126/600 |
| 3,769,493 | A |   | 10/1973 | Zeitlin et al. |
| 3,934,973 | A | * | 1/1976 | Shultz ..................... C09B 63/00 |
| | | | | 510/443 |
| 4,015,586 | A |   | 4/1977 | Vroom et al. |

(Continued)

FOREIGN PATENT DOCUMENTS

| CN | 202018141 U | 10/2011 | |
| CN | 102650468 A | * 8/2012 | ................. F24J 2/00 |

(Continued)

OTHER PUBLICATIONS

Prosecution history of U.S. Appl. No. 14/205,722 including: Application as filed; Notice of Allowance dated Nov. 25, 2014; Applicant Summary of interview with Examiner dated Nov. 14, 2014; Applicant Initiated Interview Summary dated Oct. 28, 2014; Amendment dated Dec. 27, 2014; Office Action dated Jul. 31, 2014.

(Continued)

*Primary Examiner* — Nikhil Mashruwala
(74) *Attorney, Agent, or Firm* — Steven M. Koehler; Westman, Champlin & Koehler, P.A.

(57) ABSTRACT

In one aspect, the present disclosure includes a solar fluid preheating system having a storage heater tank configured to store fluid which is in the process of being heated. The storage heater tank is encased by a cover, thereby creating an aperture extending therebetween. In another aspect, the solar fluid preheating system includes a nanoimprint lithographic layer having a plurality of nanolenses configured to concentrate and accelerate solar radiation rays. In a further aspect, the solar fluid preheating system includes a fluid vacuum system in fluidic commutation with the storage heater tank.

20 Claims, 8 Drawing Sheets

(56) References Cited

U.S. PATENT DOCUMENTS

| | | | |
|---|---|---|---|
| 4,051,890 A * | 10/1977 | Melchior | F24J 2/04 |
| | | | 126/569 |
| 4,086,958 A | 5/1978 | Lindner et al. | |
| 4,294,310 A | 10/1981 | Reusch et al. | |
| 4,328,790 A | 5/1982 | Kircus | |
| 4,333,448 A | 6/1982 | Johnson | |
| 4,344,418 A * | 8/1982 | Leroy | 126/587 |
| 4,371,028 A | 2/1983 | Helshoj | |
| 4,416,257 A | 11/1983 | Bale | |
| 4,485,802 A | 12/1984 | Babcock | |
| 4,485,804 A | 12/1984 | Sharpe | |
| 4,519,380 A | 5/1985 | Laing | |
| 4,848,616 A * | 7/1989 | Nozaki | F24H 9/0047 |
| | | | 204/196.11 |
| 4,893,611 A | 1/1990 | Kleinwachter | |
| 5,172,686 A * | 12/1992 | Anthony | A61M 16/162 |
| | | | 128/203.16 |
| 5,499,621 A | 3/1996 | Trihey | |
| 5,575,276 A | 11/1996 | Fossum et al. | |
| 6,370,328 B1 | 4/2002 | Mottershead | |
| 7,669,592 B2 * | 3/2010 | Polk | B01D 1/0035 |
| | | | 126/634 |
| 7,726,263 B2 | 6/2010 | Ben-Ishai | |
| 8,936,020 B1 * | 1/2015 | Munoz Ruiz | F24J 2/345 |
| | | | 126/640 |
| 2007/0227468 A1 | 10/2007 | Gordon et al. | |
| 2007/0227532 A1 | 10/2007 | Mehler | |
| 2009/0019931 A1* | 1/2009 | Roques et al. | G01F 23/22 |
| | | | 73/304 R |
| 2010/0192944 A1* | 8/2010 | Gruber | B01B 1/005 |
| | | | 126/698 |
| 2010/0199980 A1 | 8/2010 | Ricci et al. | |
| 2011/0021134 A1* | 1/2011 | Zwern | C02F 1/04 |
| | | | 454/343 |
| 2011/0024080 A1 | 2/2011 | Bose et al. | |
| 2011/0197878 A1 | 8/2011 | Kuffer | |
| 2011/0247572 A1 | 10/2011 | Smith et al. | |
| 2011/0271953 A1 | 11/2011 | Wortmann et al. | |
| 2012/0024499 A1 | 2/2012 | Chang et al. | |
| 2012/0097152 A1 | 4/2012 | Colson | |
| 2012/0211002 A1 | 8/2012 | Humphreys | |
| 2012/0234312 A1 | 9/2012 | Nakatani | |
| 2012/0291772 A1 | 11/2012 | Atarashiya et al. | |
| 2013/0047610 A1 | 2/2013 | Penton | |
| 2014/0030555 A1 | 1/2014 | Winkler | |
| 2014/0083414 A1 | 3/2014 | Ruiz | |

FOREIGN PATENT DOCUMENTS

| | | | | |
|---|---|---|---|---|
| CN | 202470473 U | | 10/2012 | |
| DE | 202006001353 U1 | | 5/2006 | |
| EP | 147345 A | * | 7/1985 | F24J 2/23 |
| FR | 2513361 A | * | 3/1983 | F24J 2/24 |
| FR | 2558245 A1 | | 7/1985 | |
| FR | 2575811 A1 | | 7/1986 | |
| FR | 2613045 A1 | | 9/1988 | |
| GB | 2147408 A | | 5/1985 | |
| GB | 2458272 A | * | 3/2008 | F24D 17/00 |
| GB | 2455578 A | | 6/2009 | |
| WO | 8501790 A1 | | 4/1985 | |
| WO | 2007112231 A2 | | 10/2007 | |
| WO | 2008095876 A1 | | 8/2008 | |
| WO | 2012108752 A1 | | 8/2012 | |
| WO | 2013153420 A1 | | 10/2013 | |

OTHER PUBLICATIONS

PCT International Search Report of PCT Application No. PCT/MX2011/000054 dated Nov. 30, 2011.

Mexican Patent Application No. MX/a/2010/005129 filed, Apr. 26, 2010, translation of Abstract included.

Prosecution history of U.S. Appl. No. 13/963,592 including: Office Action date Jun. 17, 2016; Preliminary dated Feb. 22, 2016.

* cited by examiner

SOLAR FLUID PREHEATING SYSTEM HAVING A THERMOSIPHONIC APERTURE AND CONCENTRATING AND ACCELERATING CONVECTIVE NANOLENSES

FIELD

The present invention relates to a solar fluid preheating system for heating a fluid.

BACKGROUND

The discussion below is merely provided for general background information and is not intended to be used as an aid in determining the scope of the claimed subject matter.

Solar heaters are a good solution for ecologically and cost-effectively heating a fluid. However, solar heaters are generally inefficient when it comes to collecting solar radiation used to heat the fluid and holding the heat stored in the fluid when the surrounding temperature is lower, such as, for example, during the hours without light from the sun.

Solar heaters typically operate according to the principle of thermosiphoning. Thermosiphoning is a process used to exchange heat from liquids without an external source (such as, for example, a mechanical pump), thereby eliminating costs associated with using the external source and simplifying the process of transferring heat. The process of thermosiphoning usually involves the use of water and natural convection, in which fluid motion is not generated by any external source, but only by density differences in the fluid occurring due to temperature gradients. Specifically, because cold water has a higher specific density and is heavier than warm water, cold water will sink down when stored in a water storage tank, causing the warm water to rise towards the top of the water storage tank.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

Some embodiments of the disclosure relate to a solar preheating system having a storage heater tank and a cover configured to process and store fluid to be heated. Some embodiments of the solar preheating system include an aperture formed between the storage heater tank and the cover, as the storage heater tank is encased by the cover. Some embodiments of the solar preheating system include a nanoimprint lithographic layer including a plurality of nanolenses detachably coupled to the cover. Some embodiments of the solar preheating system include a fluid vacuum system in fluidic communication with the aperture, where the fluid vacuum system is configured to control passage of fluid in the solar preheating system.

These and various other features will become apparent upon reading the following detailed description and upon reviewing the associated drawings.

DEFINITIONS

Unless otherwise specified, the following terms as used herein have the meanings provided below:

The terms "about" and "substantially" are used herein with respect to measurable values and ranges due to expected variations known to those skilled in the art (e.g., limitations and variabilities in measurements).

BRIEF DESCRIPTION OF THE DRAWINGS

The present invention will be further explained with reference to the attached figures, wherein like structure or features are referred to by like reference numerals throughout the several views. In order to provide a better understanding of aspects of the invention, the following drawings are herein attached.

While the above-identified figures set forth several embodiments of the present invention, other embodiments are also contemplated, as noted in the disclosure. In all cases, this disclosure presents the invention by way of representation and not limitation. It should be understood that numerous other modifications and embodiments can be devised by those skilled in the art which fall within the scope and spirit of the principles of this invention.

DETAILED DESCRIPTION OF ILLUSTRATIVE EMBODIMENTS

Illustrative embodiments of the present disclosure are directed to a solar fluid preheating system configured to provide thermal efficiency through a storage heater tank and a cover, where both the storage heater tank and the cover are shaped as spheres. The solar fluid preheating system is also configured to improve heating of fluid housed within the system by accelerating occurrence of a thermosiphonic physical effect. The thermosiphonic effect is a method of passive heat exchange based on natural convection that circulates a fluid without a mechanical pump. Convection is a type of heat transfer that occurs due to fluid motion when heated fluid is caused to move away from a source of heat. In particular, convection above a hot surface occurs because hot fluid expands, becomes less dense, and rises, thereby causing circulation of the fluid and convection currents which transport energy associated with the fluid.

Figure 1:
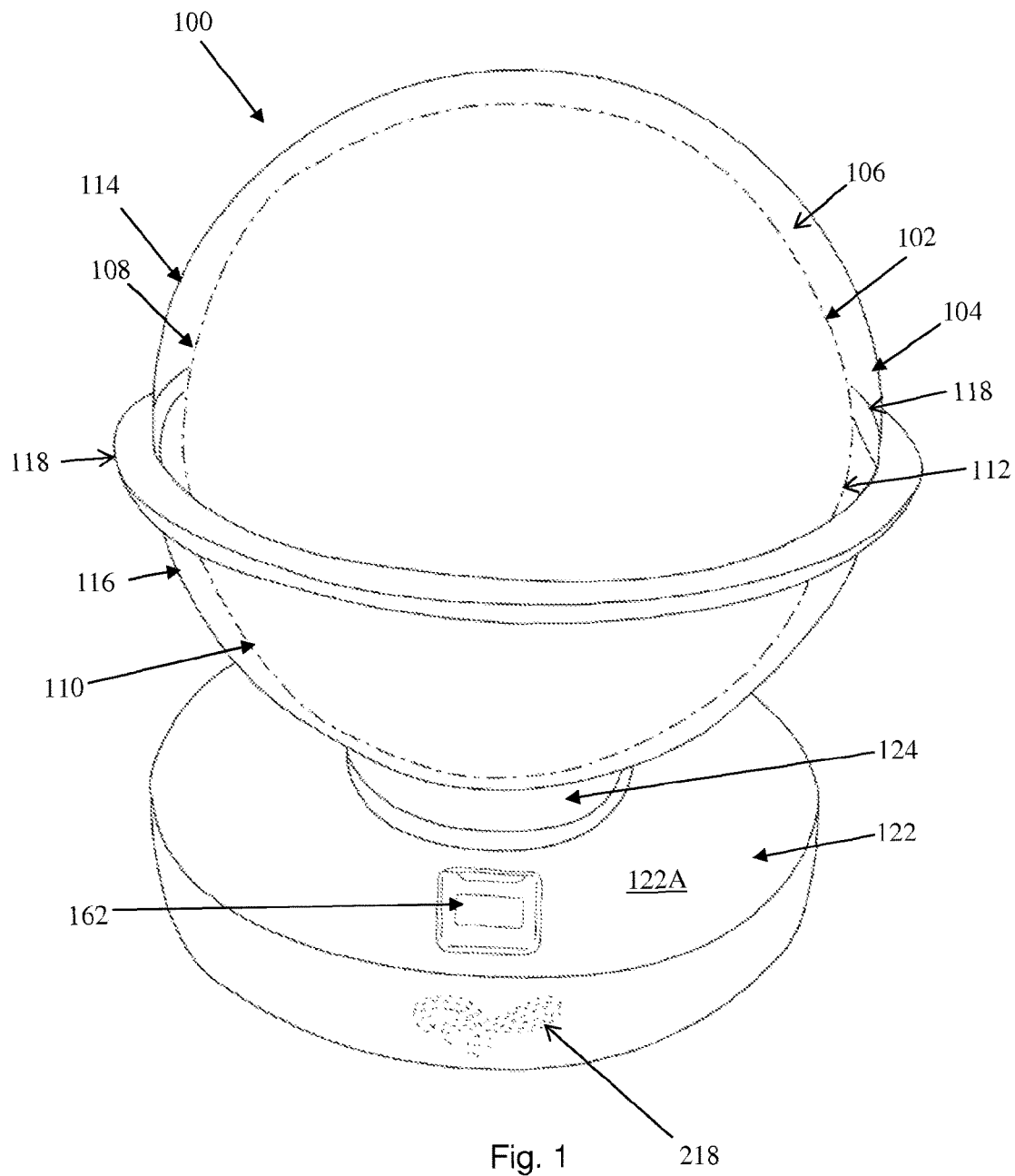
FIG. 1 is a front perspective view of a solar fluid preheating system according to one embodiment of the present disclosure.

FIG. 1 illustrates a solar fluid preheating system 100. The solar heating system 100 comprises a storage heater tank 102 configured to process and store fluid which is to be heated by the system 100. The storage heater tank 102 is shaped in the form of a geometric figure generated by revolution of a semicircle about the diameter of the figure, where every point on a surface of the storage heater tank 102 is equidistant from a center of the storage heater tank 102. For example, the geometric figure of the storage heater tank 102 can resemble the form of a round object, such as, but not limited to, a sphere. The storage heater tank 102 is configured to receive a cover 104. The cover 104 has a shape resembling the shape of the storage heater tank 102 (e.g., a sphere), such that the storage heater tank 102 is encased by the cover 104, thereby creating an aperture 106 which extends all the way throughout, and in between, the storage heater tank 102 and the cover 104. In one embodiment, the cover 102 encases (that is, surrounds) the storage heater tank 102. In one embodiment, the storage tank 102 and the cover 104 are concentric: the two components share a common center. This embodiment is illustrated in FIG. 1 where the storage tank 102 is denoted by dashed-dotted lines in order to illustrate that the storage tank 102 can be seen through the cover 104. In some embodiments, the cover 104 can be self-cleaned using rain water, thereby serving to avoid build-up of dirt or unwanted materials or particles in the solar system 100. In some embodiments, the shape of the cover 104 is aerodynamic, which improves stability of the solar fluid preheating system 100, should the system 100 be subjected to unique environmental live conditions, such as, for example, harsh high-speed winds and/or excessive snow. In one embodiment, the storage heater tank 102 and the cover 104 can be made out of the same material. In another embodiment, the storage heater tank 102 and the cover 104 can be made out of different materials. For example, in one embodiment, the storage heater tank 102 can be made out of a thermoplastic polymer, such as but not limited to, polypropylene, and the cover 104 can be made out of a different type of thermoplastic polymer, such as but not limited to, polycarbonate. In one embodiment, the cover is made from a transparent material, which optimizes the collection of solar radiation rays. The properties of the system 100 described in this disclosure allow for placing the system 100 in different physical locations subject to a variety of environmental conditions.

Figure 2:
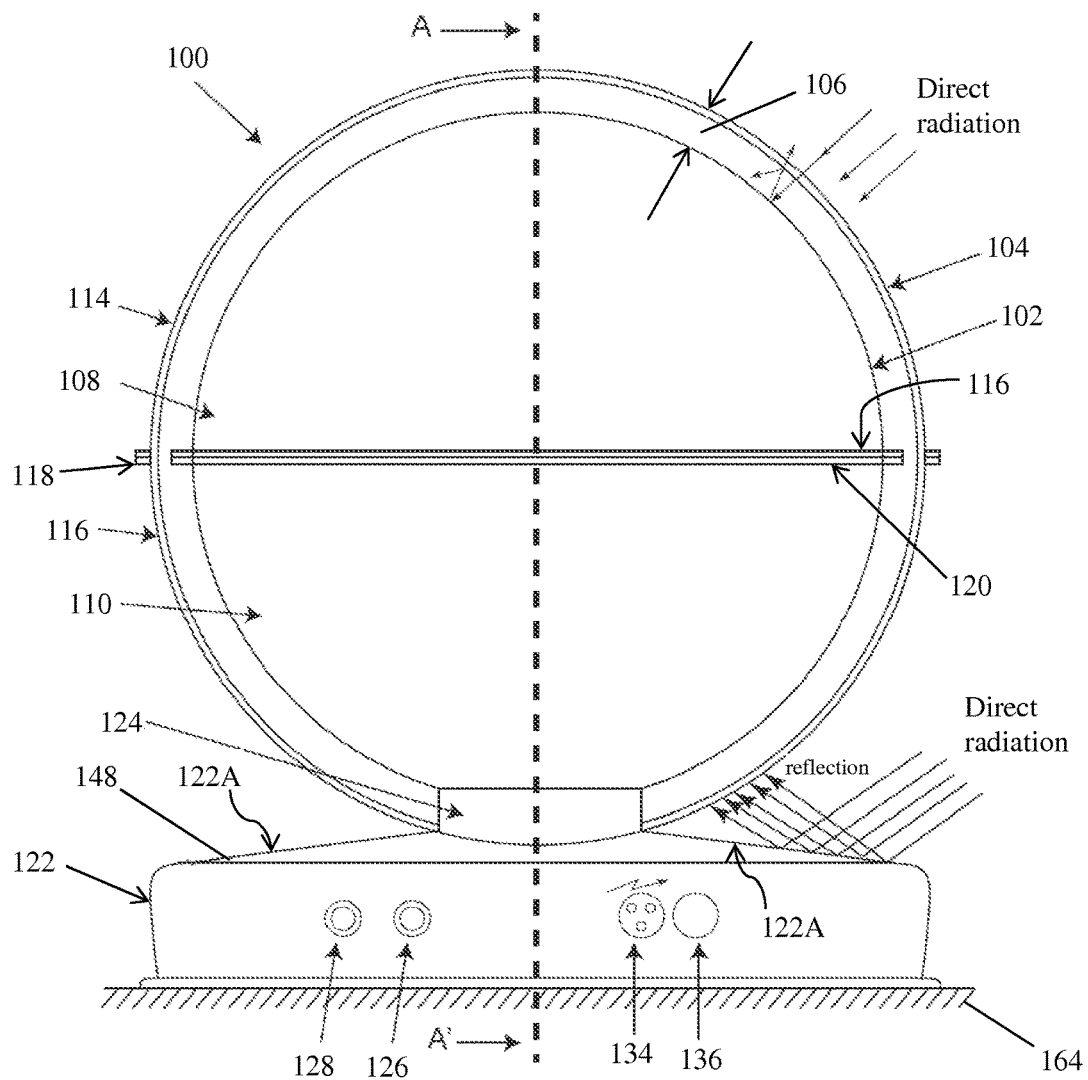
FIG. 2 is a rear view of one embodiment of the solar fluid preheating system.

In some embodiments, the storage heater tank 102 comprises an upper tank part 108 and a lower tank part 110. The upper tank part 108 is removably attached to the lower tank part 110 using any suitable fastening or coupling mechanism 112. Similarly, the cover 104 comprises an upper cover part 114 and a lower cover part 116. The upper cover part 114 is removably attached to the lower cover part 116 using any suitable fastening or coupling mechanism 118. The fastening mechanism 112, which is used to secure the upper tank part 108 to the lower tank part 110, can be the same or different than the fastening mechanism 118, which is used to secure the upper cover part 114 to the lower cover part 116. In one embodiment shown in FIG. 2, a fastening bond 120 is used to connect the fastening mechanisms 112 and 118, where the fastening bond allows for maintaining the aperture 106 in between the storage heater tank 102 and the cover 104. The fastening mechanisms 112, 118 and/or the fastening bond 120 can bet formed using casting or adhesive bonding processes and materials. For example, the material used for the fastening mechanisms 112, 118 and/or the fastening bond 120 can include thermoplastics.

As shown in FIGS. 1-5, the aperture 106 forms a hollow circular ring that separates the storage heater tank 102 from the cover 104. In some embodiments, the aperture 106 has a width that is uniform throughout the circular ring, such that a space separating the storage heater tank 102 from the cover 104 remains constant. In other embodiments, the aperture 106 has a variable width, such that a space formed between the upper tank part 108 and the upper cover part 114 is different than a space formed between the lower tank part 110 and the lower cover part 116. The aperture 106 and the spherical shapes of the storage heater tank 102 and the cover 104 allow for optimal collection of solar radiation from the Sun at any time during the day and at any solar declination, which varies with each season due to the tilt of the Earth about the Earth's axis of rotation and the rotation of the Earth around the Sun. Moreover, the shape of the solar fluid preheating system 100 optimizes the efficiency of the total area for collecting heated fluid inside the storage heater tank 102 by approximately 30 percent. The aperture 106 is configured to suppress thermal losses of the storage heater tank 102 by convection and by transmission. Any further loss of energy from radiation rays is reduced when infrared radiation rays emitted by the storage heater tank 102 are contained inside the cover 104. The configurations of the storage heater tank 102 with respect to the cover 104 described herein cause the formation of mechanical loads that balance the two elements in such a manner that vacuum isolation inside the aperture 106 is formed.

Figure 3:
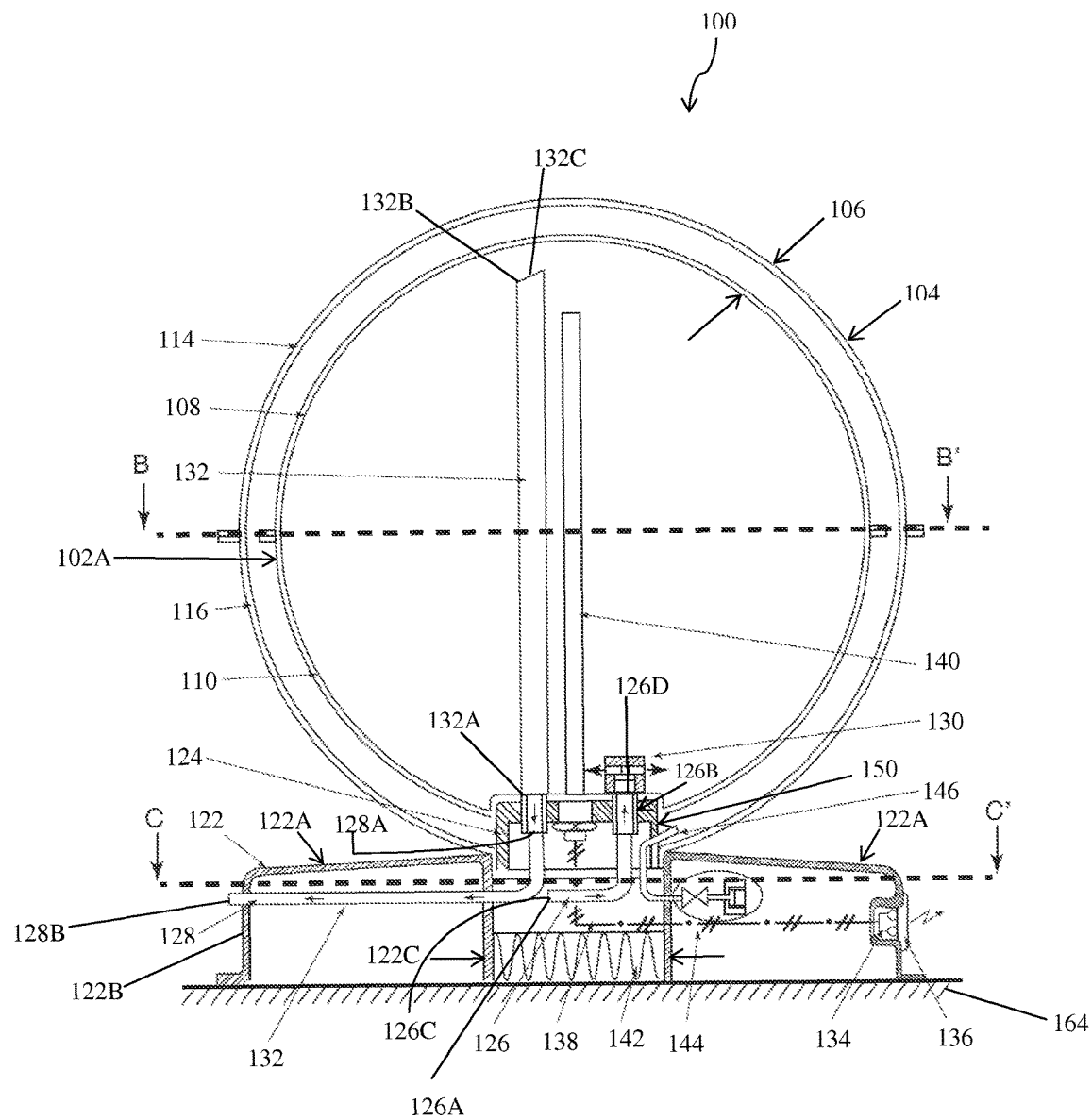
FIG. 3 is a sectional view of the solar fluid preheating system, as taken along lines A-A' in FIG. 2.
Figure 4:
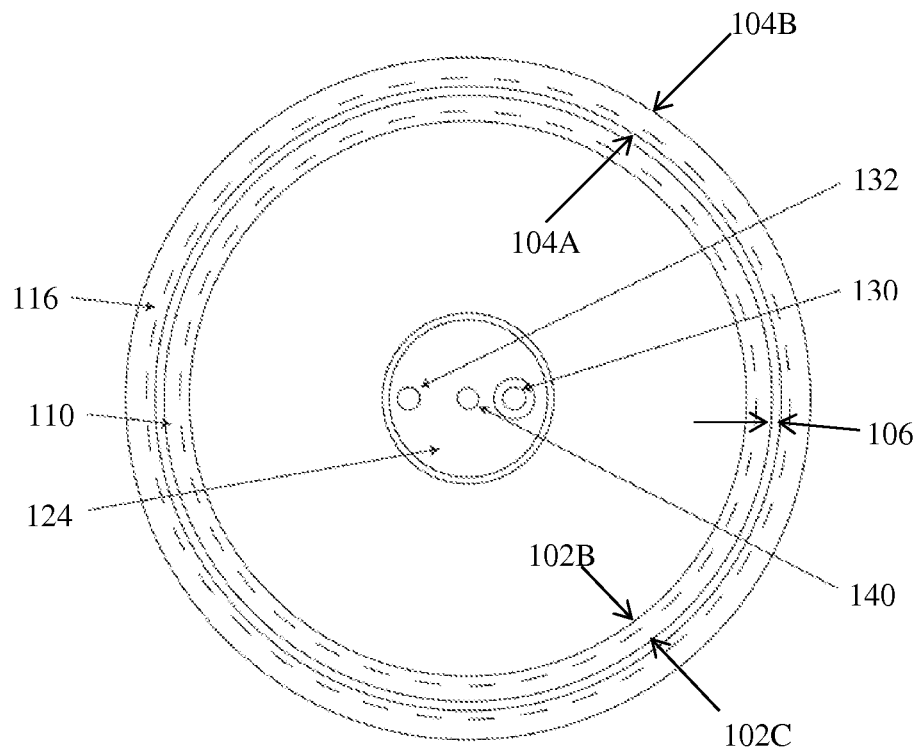
FIG. 4 is a sectional view of the solar fluid preheating system, as taken along lines B-B' in FIG. 3.
Figure 5:
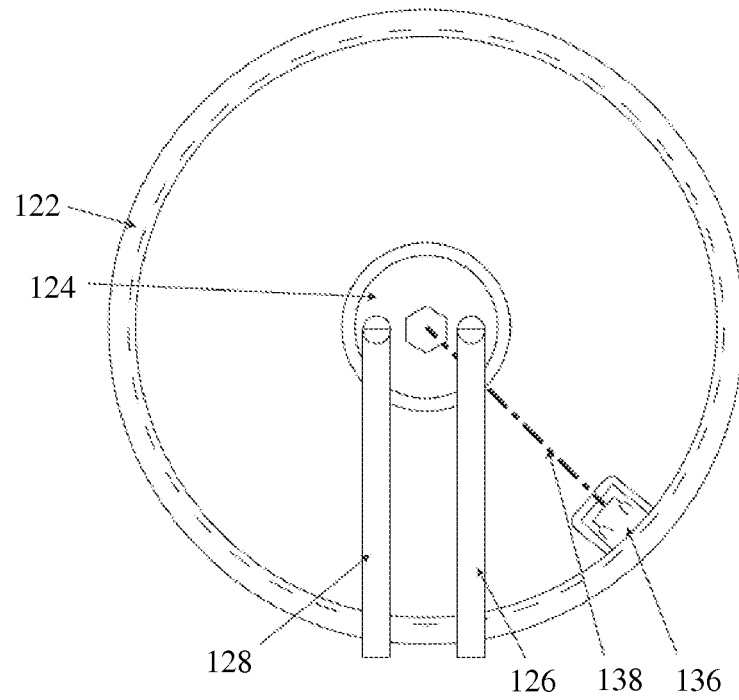
FIG. 5 is a sectional view of the solar fluid preheating system, as taken along lines C-C' in FIG. 3.

In one embodiment illustrated in FIG. 1, the solar fluid preheating system 100 includes a base 122. The base 122 is configured to support the storage heater tank 102, the cover 104, the aperture 106, and any elements used in connection therewith above the ground 164 using a supporting mechanism and joint collar 124. The base 122 includes an upper surface 122A interconnected to a base element 122B having an opening 122C. In one embodiment, the base element 122B has a substantially circular shape. In another embodiment, the base 122 is substantially hollow except as that the base 122 can be used to support elements of the system 100 as described herein. The supporting mechanism and joint collar 124 can include any type of abutting joint sealed by a joint collar. As illustrated in FIG. 3, the supporting mechanism and joint collar 124 is adapted to provide an enclosure for the opening 122C in the base element 122B. The supporting mechanism and joint collar 124 can include a strip or a band used to support and hold the storage heater tank 102, the cover 104, the aperture 106, and any supporting elements thereof in place. The supporting mechanism and joint collar 124 can be made out of a thermoplastic polymer having a low transmission coefficient. The polymer can include, but is not limited to, polypropylene. In one exemplary embodiment, the upper surface 122A of the base 122 includes a reflective surface finish 148, which accelerates occurrence of the thermosiphonic physical effect by receiving a plurality of direct solar radiation rays (shown in FIG. 2) and producing a plurality of reflection rays directed at the cover 104 and the storage heater tank 102 (also shown in FIG. 2). Direct radiation rays (also called beam radiation rays) are solar radiation rays that travel on a straight line from the Sun down to the surface of the Earth. Diffuse radiation rays describe sunlight rays that have been scattered by molecules and particles in the atmosphere but have still made it down to the surface of the Earth. Reflected radiation rays are sunlight rays that have been reflected off of non-atmospheric elements, such as the ground. In one embodiment, the upper surface 122A of the base 122 is sloped at an angle a with respect to a horizontal plane extending substantially parallel to the ground 164. The spherical shape of the cover 102 and the storage heater tank 102 provide for optimal collection of solar radiation rays that are reflected by the base 122 and are received at any point on the cover 102. Those skilled in the art will recognize that the ground 164 can include any solid surface of the Earth, and/or any type of naturally-occurring soil, such as, for example, land, prairie, meadow, hayfield, and grassland, and/or human-made ground, such as, for example, asphalt and concrete.

In the illustrative embodiment, the base 122 includes an inlet tube 126 and an outlet tube 128. The inlet tube 126 and the outlet tube 128 are used to control the flow of fluid in the solar fluid preheating system 100. As shown in FIG. 2-5, the inlet tube 126 is housed in the base 122. The inlet tube 126 has a first end 126A having an opening 126C and a second end 126B having an opening 126D. As shown in FIG. 3, the first end 126A of the inlet tube 126 extends in a plane parallel to the base 122. The inlet tube 126 then curves in a direction upward from the base 122 at an angle of approximately 90 degrees. In the illustrative embodiment, the curve is about the middle of the inlet tube 126. After the inlet tube 126 curves upwardly from the base 112, the inlet tube 126 extends vertically until the tube 126 couples to a fluid diffuser 130. The second end 126B of the inlet tube 126 is adapted to fluidly couple to the fluid diffuser 130. The opening in the second end 126B of the inlet tube 126 distributes, through the fluid diffuser 130, cold fluid inside the storage heater tank 102. In the illustrative embodiment, the fluid diffuser 130 is configured to distribute the cold fluid in an area of the storage heater tank 102 that is located at the lowest points inside the storage heater tank 102 (that is, for example, the area of the storage tank 102 located closest to the supporting mechanism and joint collar 124).

As shown in FIG. 3, the outlet tube 126 is housed in the base 122. The outlet tube 128 has a first end 128A having an opening and a second end 128B having an opening. The first end 128A of the outlet tube 128 extends in a plane parallel to the base 122 and through an opening in the base 122 that is exposed to the environment. The outlet tube 128 curves in a direction upward from the base 122 at an angle of approximately 90 degrees. The outlet tube 128 extends vertically inside the supporting mechanism and joint collar 124 until the outlet tube 128 reaches a stand pipe 132. The stand pipe 132 is a pipe extending vertically inside the storage heater tank 102, in a direction away from the base 122 and straight towards the highest area of the storage tank 102, so that the hottest fluid will be subject to extraction by the stand pipe 132. The stand pipe 132 has a first end 132A coupled to the second end 128B of the outlet tube 128. The stand pipe 132 has a second end 132B which extends inside the storage heater tank 102 and is configured to receive fluid therefrom. The first end 132A of the stand pipe 132 is contained in a plane that is located at a lower altitude than planes containing the second end 132B and the bevel opening 132C. As shown in FIG. 3, the first end 128A of the outlet tube 128 is detachably coupled to the first end 132A of the stand pipe 132. As fluid is received by the stand pipe 132, the second end 132B of the stand pipe 132 is configured to provide the fluid at a desired pressure. In one embodiment, the second end 132B of the stand pipe 132 has a bevel opening 132C, where the slant of the pipe 132 follows the overall curve of geometric figure generated by the shape of the storage heater tank 102.

The solar fluid preheating system 100 includes an electrical junction box 134 adapted to store electrical components used to control and measure variables associated with the system 100. In one embodiment, the electrical junction box 134 is encased by a lid 136 so as to conceal the electrical components from external environmental conditions. The electrical junction box 134 receives an electrical cable 138.

The electrical cable 138 is housed inside the base 122 and the supporting mechanism and joint collar 124. The electrical cable 138 is adapted to couple to a resistor 140, which is adapted to heat any fluid located inside the storage heater tank 102. The resistor 140 is supported by the supporting mechanism and joint collar 124. The resistor 140 extends longitudinally inside the storage heater tank 102. In an exemplary embodiment, the resistor 140 can be self-regulating: operating at a predetermined working temperature without the need of a thermostat. Using the self-regulating resistor would simplify the operation steps that a user would have to undergo when operating the system 100. In one embodiment, the predetermined temperature of the resistor 140 is between 39 degrees Celsius and 45 degrees Celsius. In one exemplary embodiment, the predetermined temperature of the resistor 140 is 45 degrees Celsius. It should be noted that the surface temperature of a PTC-type resistor typically does not exceed 70 degrees Celsius. This could limit and reduce the precipitation of solids on the surface of the resistor 140 and prevent any unwanted effects that could compromise the integrity of the material used to make the storage heater tank 102.

In one embodiment, the solar fluid preheating system 100 includes isolating material 142. The isolating material 142 extends in the base 122 and serves to avoid formation of a thermal bridge with the soil 164 which could lead to heat loss. As used herein, the term "thermal bridge" refers to a localized area of the system 100 where a penetration of the insulation material 142 by a conductive material could take place in the separation between an interior and exterior environments of the system 100.

In one embodiment, the solar fluid preheating system 100 includes a vacuum valve 144. The vacuum valve 144 is housed inside the base 122. The vacuum valve 144 is connected to a vacuum tube 146 and extends through the opening 122C in the base 122 and an opening 150 in the supporting mechanism and joint collar 124 until the vacuum tube 146 forms fluid connection with the aperture 106. It should be noted that the connections between any of the components of the solar fluid preheating system 100 should exhibit layers of isolation and airtightness aimed at preventing loss of fluid heat.

Figure 6:
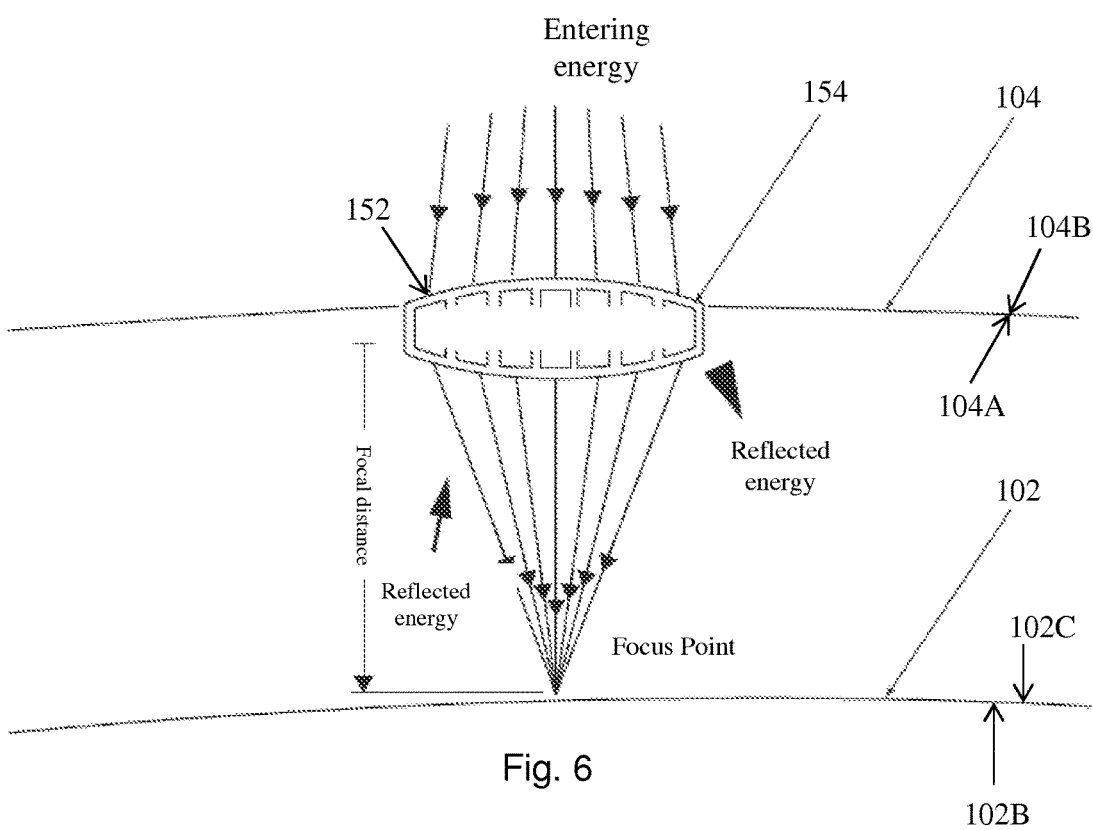
FIG. 6 is a close-up view of one embodiment of a solar fluid preheating system disclosed in the present application.

In one embodiment illustrated in FIG. 6, the solar fluid preheating system 100 includes a nanoimprint lithographic layer 152 detachably coupled to the cover 104. The lithographic layer 152 can be flexible and transparent to the human eye. The lithographic layer 152 can include a plurality of nanolenses 154. The nanolenses 154 can be convergent in order to direct and concentrate the heat. The nanolenses 154 are further configured to accelerate occurrence of the solar radiation. The nanolenses 154 can be printed using any suitable nanoprinting technique. In one exemplary embodiment, each of the plurality of nanolenses 154 can have a size of 100 nanometers, where a nanometer is a unit of length which equals to 1/1,000,000,000th (one billionth) of a meter. Each of the plurality of nanolenses 154 is designed to concentrate direct, reflected and diffused solar radiation rays that impacts any point on the storage heater tank 102 (shaped as a sphere) to a focal length equivalent to the aperture 106. This allows the storage heater tank 102 to receive a concentrated (intense) amount of solar radiation at a higher temperature as compared to the amount of solar radiation the tank would receive without having the plurality of nanolenses. The higher temperature of the collection surface accelerates heating of the fluid and increases efficiency of the thermal exchange. The aperture 106 creates a vacuum that helps to prevent concentrated radiation refraction in the air from occurring and to eliminate heat losses due to convection and transmission of the storage heater tank 102.

In one embodiment, the storage heater tank 102 includes an outer side 102B facing the cover 104, where the outer side 102B is coated by a selectively optimizing surface 102A that optimizes collection of the infrared radiation rays. When the infrared radiation rays, which are reflected by the storage heater tank 102, collide against the plurality of nanolenses 154 located at the inner side of the cover 104, which diverge when the radiation rays reach the nanolenses 154 in the opposite direction, diffusion rays are generated. The diffusion rays bounce the infrared radiation rays back to the storage heater tank 102. Infrared radiation energy is most effectively and efficiently trapped inside the storage heater tank 102 when the selectively optimizing surface is used, as opposed to when transparent, smooth or non-coated materials are used on the surface of the storage heater tank 102. This leads to the occurrence of a greenhouse effect, which is a process by which thermal radiation from a planetary surface is absorbed by atmospheric greenhouses gases, and is reradiated in all directions. The focal length between the nanolenses 154, the light source and the focal point can depend upon the point of origin of the received radiation, which is achieved through the aperture 106, which in turn is formed by the arrangement of the two solar radiation collection concentric spheres.

Figure 7A:
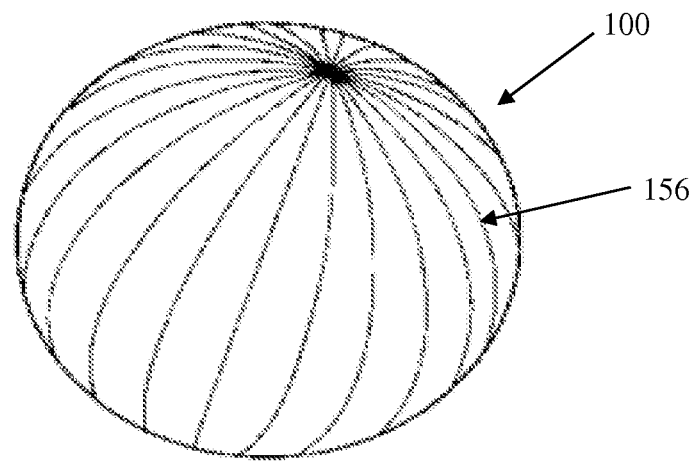
FIG. 7A is a perspective view of the solar fluid preheating system according to one embodiment of the present disclosure.
Figure 7B:
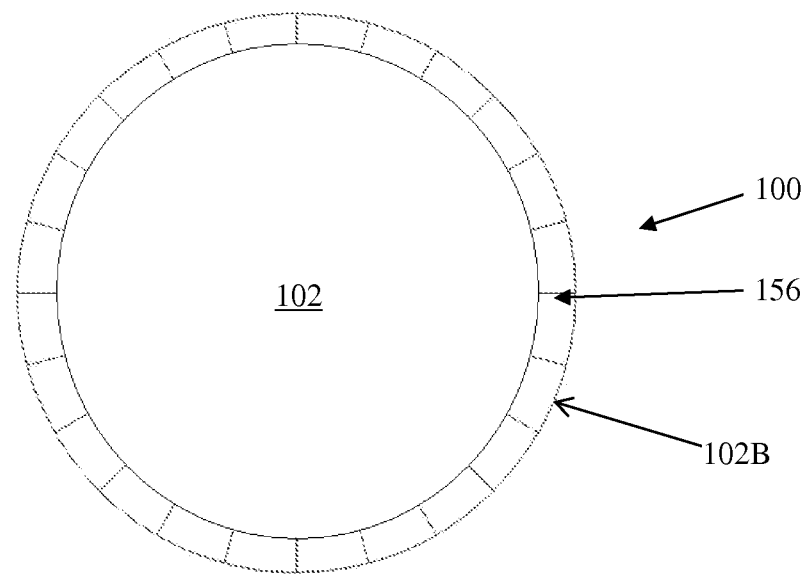
FIG. 7B is a sectional view of the solar fluid preheating system of FIG. 7A.

In one embodiment illustrated in FIGS. 7A and 7B, the solar fluid preheating system 100 includes a plurality of channels 156 coupled to an inner side 102B of the storage heater tank 102 facing the fluid. The plurality of channels 156 are configured to accelerate the thermosiphonic effect and enhance convection heating of the fluid stored inside the storage heater tank 102. The solar radiation which is reflected and concentrated through the plurality of channels 156 causes a rise in the outer surface temperature of the storage heater tank 102. This, in turn, heats the fluid which is in direct contact with the inner side of the storage heater tank 102. When the fluid is heated, the fluid advances upwards through the channels 156. The ascended fluid is replaced by cold fluid located inside the storage heater tank 102. This movement generates a thermosiphonic process, accelerating the convective heating of the fluid stored inside the storage heater tank 102. It should be noted that the plurality of channels 156 allow for heating of the fluid to occur in a direction from top to bottom instead of convention heating from the outside to the inside of the storage heater tank 102, which would normally be expected to occur in a storage heater tank with smooth inner walls and no channels. In one embodiment, the plurality of channels 156 are uniform and equidistant from one another. In another embodiment, the plurality of channels 156 vary in width. For example, the plurality of channels 156 coupled to the upper tank part 108 can be different in width from the plurality of channels 156 coupled to the lower tank part 110.

Figure 9:
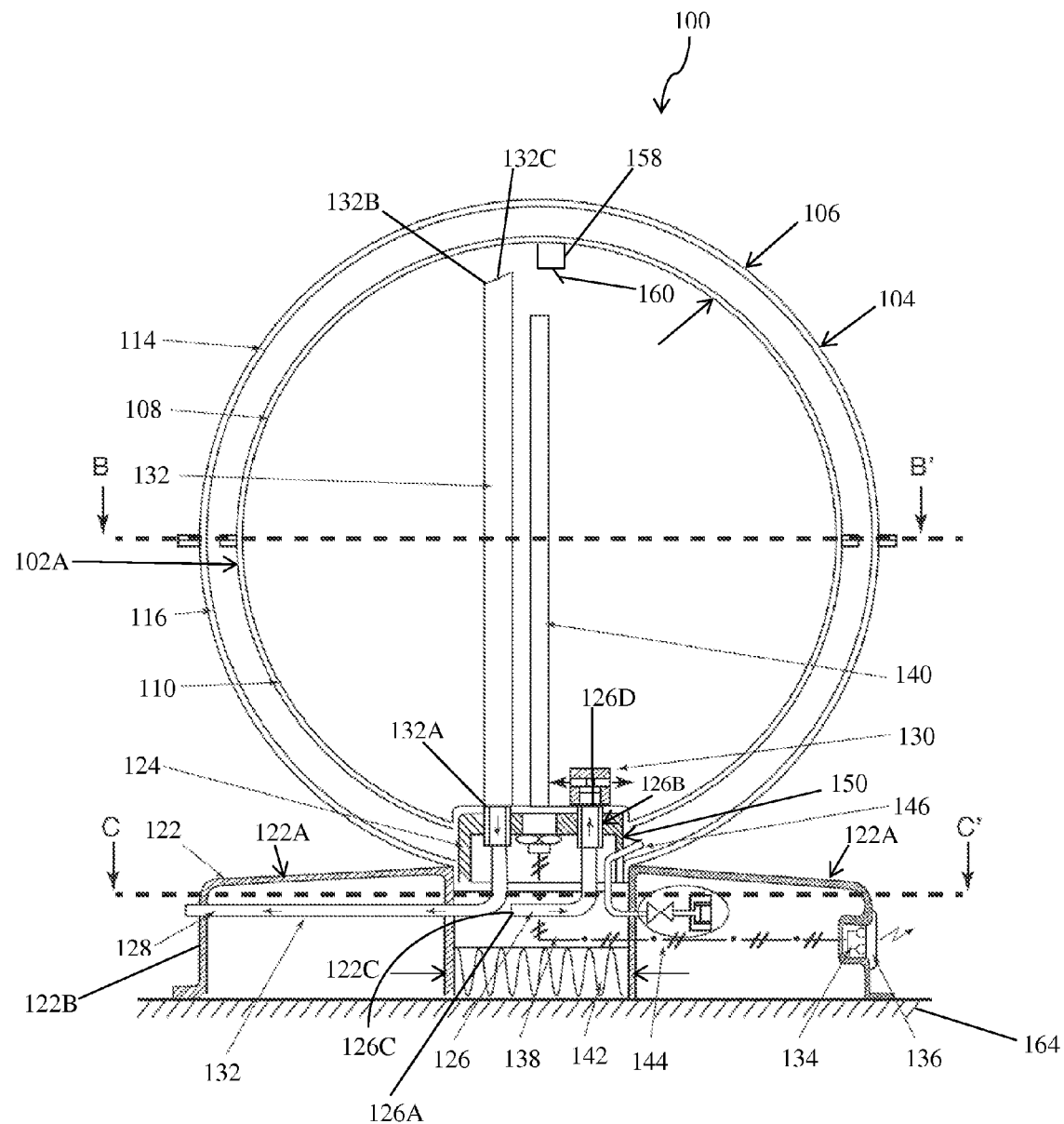
FIG. 9 is a sectional view of a solar fluid preheating system according to one embodiment of the present application, as taken along lines A-A' in FIG. 2.

In one embodiment illustrated in FIG. 9, the solar fluid preheating system 100 includes a sensor 158 removably attached at to inner side 102B of upper tank part 108. The sensor 158 includes a probe 160 configured to receive information associated with temperature of the fluid stored in the storage heater tank 102. In one embodiment, the probe 160 is deployed on the top of the sensor 158 facing the fluid. In another embodiment, the sensor 158 is configured to transmit the temperature information wirelessly to a control system 162 (shown in FIG. 1). In one exemplary embodiment, the control system 162 includes an input/output interface comprising a wireless or infrared input/output circuit providing a communication link configured to communicate with the electrical cable 138 and the resistor 140. It should be noted that the control system 162 can be located away from the solar fluid preheating system 100. In one embodiment, the distance between the control system 162 and the solar fluid preheating system 100 can be up to 30 meters. This embodiment would allow a user to measure the temperature of the stored fluid and, depending on the measured temperature, to selectively turn the resistor 140 on or off in order to optimize the use and energy consumption of the resistor.

Figure 8:
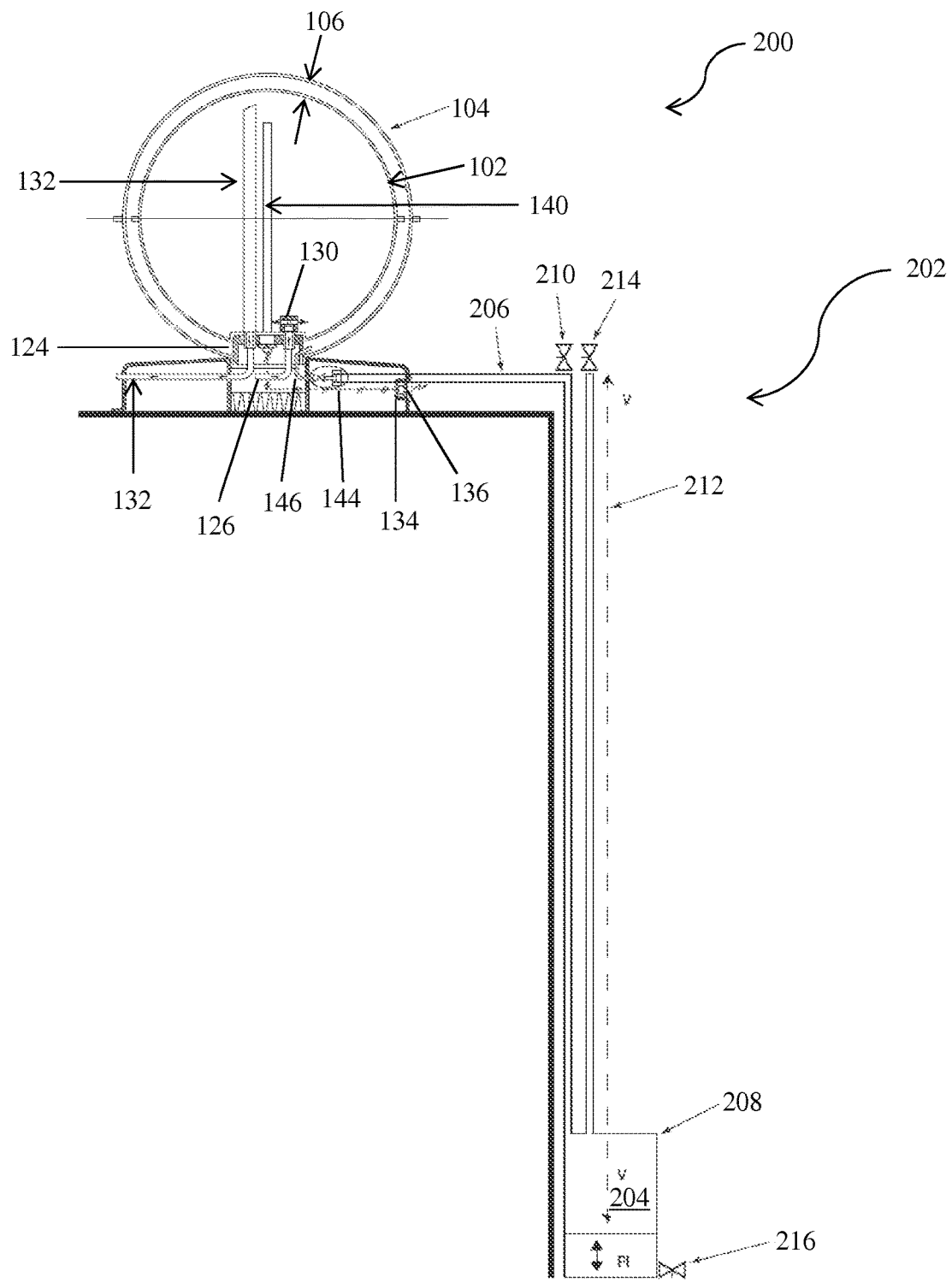
FIG. 8 is a perspective view of a solar fluid preheating system according to a further embodiment disclosed in the present application.

FIG. 8 illustrates another embodiment of the solar fluid preheating system 200 having a fluid vacuum system 202. The fluid vacuum system 202 includes a vacuum tank 208 having fluid therein, where the vacuum tank 208 is in fluidic communication with the aperture 106. The fluid vacuum system 202 is adapted to control the passage of fluid from the aperture 106 through the vacuum valve 144 to the vacuum tube 146. The vacuum tube 146 is coupled to a first tube 206 having a first valve 210 through the vacuum valve 144. An opposite end of the first tube 206 is connected to the vacuum tank 208. A second tube 212 is coupled to a top surface of the vacuum tank 208 and extends upwardly until the second tube 212 reaches a plane that is located at substantially the same latitude as the solar heater tank 102. A third valve 216 is coupled to a bottom surface of the vacuum tank 208. Those skilled in the art will recognize that the tubes 206, 212 and the valves 210, 214, 216 can be controlled manually or automatically.

In the illustrative embodiment, the vacuum tank 208 is disposed at a lower latitude than the solar heater tank 102, creating a suitable difference in height between the vacuum tank 208 and the heater tank 102. For example, that difference in height between the vacuum tank 208 and the heater tank 102 can be between 5 and 10 meters. In one exemplary embodiment, the solar heater tank 102 is placed on a roof of a house, where the vacuum tank 208 is placed on the ground next to the foundation of the house. When the vacuum tank 208 is in an "open" position, the fluid in the vacuum tank 208 is flowing and can be extracted out of the tank 208, thereby creating a suction effect which draws any fluid from the aperture 106. When the vacuum tank 208 is switched to a "closed" position, the fluid in the vacuum tank 208 stops flowing out of the tank 208, thereby creating a vacuum effect where the fluid remaining in the tank 208 functions as a type of hydraulic seal to block fluid from being drawn out of the aperture 106. The vacuum tank 208 is in the "open" position, allowing for flow and extraction of fluid, when the first valve 210 and the second valve 214 of the first tube 210 and the second tube 212, respectively, are opened, and the third valve 216 at the bottom of the vacuum tank 208 is closed. This configuration allow for fluid to be introduced in the vacuum tank 208 through the first valve 210 until the vacuum tank 208 is filled and any overflowing fluid is received by the second valve 214. The vacuum tank 208 is in the "closed" position, preventing flow and extraction of fluid, when the first valve 210 and the second valve 214 are closed and the third valve 216 is open. This configuration draws fluid out of the vacuum tank 208 and creates the suction which draws the fluid from the aperture 106.

By using the configurations described herein, the thickness of the material used for the storage heater tank 102 and the cover 104 can be reduced, thereby optimizing even further the total area available to collect fluid which is in the process of being heated. Further, embodiments of the present disclosure cause convection movement patterns that improve heat transmission efficiency by up to 25 percent, as compared to the heat transmission efficiency created in systems with different geometric shapes, such as, for example, cylindrical or rectangular shapes. The spherical shape of the storage heater tank 102 improves the thermal conduction of the solar fluid preheating system, because the spherical shape creates a larger transmission surface that allows for substantially all points of the storage heater tank 102 to be in direct contact with the fluid. The thermal conduction causes fluid having higher temperature to rise and fluid at the central portion of the storage heater tank 102 having colder temperature go downwards, thereby occupying the space which used to be occupied by the risen fluid.

In some embodiment, the solar preheating system includes a logo, emblem or pictorial image 218 that represents the company used to create or manufacture the system.

The figures used in the present application are schematic drawings, where location of the various components can be varied as necessary to accommodate the desired objects to be stored therein.

It should be noted that the elements and/or assemblies of the dispensing apparatus can be connected with suitable fasteners as necessary to allow the storage device to be shipped in a disassembled state. Although the subject matter has been described in a language specific to structure features and/or methodological acts, it is to be understood that the subject matter defined in the appended claims is not necessarily limited to the specific features or acts described above as has been determined by the courts. Rather, the specific features and acts described above are disclosed as example forms of implementing the claims.

While the above-identified figures set forth several embodiments of the present invention, other embodiments are also contemplated, as noted in the disclosure. In all cases, this disclosure presents the invention by way of representation and not limitation. It should be understood that numerous other modifications and embodiments can be devised by those skilled in the art which fall within the scope and spirit of the principles of this disclosure.

Although the present invention has been described with reference to preferred embodiments, workers skilled in the art will recognize that changes may be made in form and detail without departing from the spirit and scope of the disclosure.

What is claimed is:

1. A solar preheating system, comprising:
   a storage heater tank configured to process and store fluid, wherein the storage heater tank is shaped as a sphere;
   a cover adapted to be received by the storage heater tank, wherein the storage heater tank is encased by the cover, wherein the cover is shaped as a sphere, wherein an outer surface of the storage heater tank and an inner surface of the cover are concentric and spaced apart to form a concentric space surrounding the outer surface of the storage heater tank, and wherein the concentric space comprises a vacuum;
   a base configured to support the solar preheating system;
   an inlet tube housed in the base and configured to distribute, through a fluid diffuser, cold fluid inside the storage heater tank, wherein the fluid diffuser is coupled to the inlet tube;
   an outlet tube housed in the base and configured to control flow of fluid; and
   a plurality of channels coupled to an inner side of the storage heater tank, the inner side of the storage heater tank facing the fluid to enhance convection of the fluid, wherein the plurality of channels is configured such that thermosiphonic action is created in the fluid of the tank where fluid ascends upwards through the plurality of channels when the fluid is heated, and wherein the ascending fluid is replaced by colder fluid located inside the storage heater tank.

2. The solar preheating system of claim 1, wherein a resistor is self-regulating.

3. The solar preheating system of claim 1, further comprising a sensor removably attached to the storage heater tank.

4. The solar preheating system of claim 1, wherein the storage heater tank comprises an upper tank part removably attached to a lower tank part using any suitable fastening or coupling mechanism.

5. The solar preheating system of claim 1, wherein the cover comprises an upper cover part removably attached to a lower cover part using any suitable fastening or coupling mechanism.

6. The solar preheating system of claim 1, further comprising a supporting mechanism and joint collar configured to support and hold the solar preheating system in place.

7. The solar preheating system of claim 1, wherein the cover comprises transparent material.

8. The solar preheating system of claim 1, further comprising a base configured to support the solar preheating system above ground.

9. The solar preheating system of claim 8, wherein the base comprises an upper surface, wherein the upper surface of the base is sloped at an angle $\alpha$ with respect to a horizontal plane extending substantially parallel to the ground.

10. The solar preheating system of claim 1, wherein the base comprises a reflective surface configured to receive a plurality of direct solar radiation rays and produce a plurality of reflection rays directed at the cover and the storage heater tank.

11. The solar preheating system of claim 1, wherein the base comprises a base element having a substantially circular shape.

12. The solar preheating system of claim 1, wherein the storage heater tank comprises a thermoplastic polymer.

13. The solar preheating system of claim 12, wherein the thermoplastic polymer is polypropylene.

14. The solar preheating system of claim 1, wherein the cover comprises a thermoplastic polymer.

15. The solar preheating system of claim 14, wherein the thermoplastic polymer is polycarbonate.

16. The solar preheating system of claim 2, wherein the resistor is configured to operate at a predetermined temperature.

17. The solar preheating system of claim 2, further comprising a communication link configured to facilitate communication between the resistor and an input/output interface.

18. The solar preheating system of claim 17, wherein the input/output interface comprises a wireless or infrared input/output circuit.

19. The solar preheating system of claim 1, wherein each channel of the plurality of channels runs along the inner side of the storage heater tank from an upper tank part to a lower tank part.

20. The solar preheating system of claim 1, wherein channels of the plurality of channels are uniform and equal distance from each other.

* * * * *

UNITED STATES PATENT AND TRADEMARK OFFICE
CERTIFICATE OF CORRECTION

PATENT NO. : 9,534,811 B2  
APPLICATION NO. : 14/588365  
DATED : January 3, 2017  
INVENTOR(S) : Andrés Muñoz Ruiz Page 1 of 1

It is certified that error appears in the above-identified patent and that said Letters Patent is hereby corrected as shown below:

On the Title Page

Other Publications:  
Delete:  
"Prosecution history of U.S. Appl. No. 14/205,722 including: Application as filed; Notice of Allowance dated Nov. 25, 2014 ; Applicant Summary of interview with Examiner dated Nov. 14, 2014; Applicant Initiated Interview Summary dated Oct. 28, 2014; Amendment dated Dec. 27, 2014; Office Action dated Jul. 31, 2014."

And insert:  
--Prosecution history of U.S. Appl. No. 14/205,722 including: Application as filed; Notice of Allowance dated Nov. 25, 2014; Applicant Summary of interview with Examiner dated Nov. 14, 2014; Applicant Initiated Interview Summary dated Oct. 28, 2014; Amendment dated Oct. 27, 2014; Office Action dated Jul. 31, 2014.--

Signed and Sealed this  
Tenth Day of July, 2018

Andrei Iancu  
*Director of the United States Patent and Trademark Office*